United States Patent
Kakiuchi et al.

(10) Patent No.: US 7,348,368 B2
(45) Date of Patent: Mar. 25, 2008

(54) PIGMENT-DISPERSED AQUEOUS RECORDING LIQUID AND PRINTED MATERIAL

(75) Inventors: Munetaka Kakiuchi, Yokkaichi (JP); Shuichi Kataoka, Suwa (JP); Takashi Oyanagi, Suwa (JP); Kimihiko Ohya, Himeji (JP); Seiji Kamamasu, Himeji (JP)

(73) Assignees: Mitsubishi Chemical Corporation, Tokyo (JP); Seiko Epson Corporation, Tokyo (JP); Mikuni Shikiso Kabushiki Kaisha, Himeji-shi (JP)

( * ) Notice: Subject to any disclaimer, the term of this patent is extended or adjusted under 35 U.S.C. 154(b) by 272 days.

(21) Appl. No.: 10/790,819

(22) Filed: Mar. 3, 2004

(65) Prior Publication Data

US 2004/0229976 A1   Nov. 18, 2004

(30) Foreign Application Priority Data

Mar. 4, 2003   (JP) ............................. 2003-057690

(51) Int. Cl.
    *C09D 11/00* (2006.01)
(52) U.S. Cl. ............... 523/160; 523/161; 524/495; 524/507; 524/522; 524/589; 524/590; 428/195.1
(58) Field of Classification Search .......... 523/160, 523/161
    See application file for complete search history.

(56) References Cited

U.S. PATENT DOCUMENTS

| | | | | |
|---|---|---|---|---|
| 5,748,208 A | * | 5/1998 | Uchiyama et al. | 347/43 |
| 5,750,592 A | * | 5/1998 | Shinozuka et al. | 523/161 |
| 5,772,746 A | * | 6/1998 | Sawada et al. | 106/31.86 |
| 5,879,439 A | * | 3/1999 | Nagai et al. | 106/31.28 |
| 6,245,832 B1 | * | 6/2001 | Suzuki et al. | 523/160 |
| 6,383,644 B2 | * | 5/2002 | Fuchs | 428/424.8 |
| H2113 H | * | 1/2005 | Nichols et al. | 523/160 |
| 6,848,777 B2 | * | 2/2005 | Chen et al. | 347/100 |
| 6,908,185 B2 | * | 6/2005 | Chen et al. | 347/96 |
| 2003/0184629 A1 | * | 10/2003 | Valentini et al. | 347/100 |
| 2004/0041891 A1 | * | 3/2004 | Rao et al. | 347/101 |
| 2004/0092622 A1 | * | 5/2004 | Pearlstine et al. | 523/160 |
| 2004/0110867 A1 | * | 6/2004 | McCovick | 523/160 |

FOREIGN PATENT DOCUMENTS

| | | |
|---|---|---|
| EP | 1 086 975 | 4/1999 |
| EP | 1 086 975 A1 | 3/2001 |
| EP | 1 167 466 | 6/2001 |
| EP | 1 167 466 A1 | 1/2002 |
| EP | 1 270 251 | 6/2002 |
| EP | 1219686 A1 * | 7/2002 |
| EP | 1 270 251 A2 | 1/2003 |
| JP | 6-116522 | 4/1994 |
| JP | 6-279718 | 10/1994 |
| JP | 7-82516 | 3/1995 |
| JP | 10-168151 | 6/1998 |
| JP | 2002-20673 | 1/2002 |
| WO | WO 00/52106 | 9/2000 |
| WO | WO 03/062331 | 1/2003 |
| WO | WO 03/062331 A1 | 7/2003 |

* cited by examiner

*Primary Examiner*—Bernard Lipman
(74) *Attorney, Agent, or Firm*—Oblon, Spivak, McClelland, Maier & Neustadt, P.C.

(57) ABSTRACT

A pigment-dispersed aqueous recording liquid containing at least a pigment and a resin, which comprises from 60 to 200 parts by weight of the resin to 100 parts by weight of the pigment, wherein at least one of the resin is a water-dispersible urethane type resin, a weight fraction of a polyurethane urea part of which is at most 2.0 wt % to the urethane resin, and the pigment dispersed in the recording liquid has a dispersion particle size D50 of from 40 to 100 nm.

15 Claims, No Drawings

PIGMENT-DISPERSED AQUEOUS RECORDING LIQUID AND PRINTED MATERIAL

The present invention relates to a pigment-dispersed aqueous recording liquid, particularly a pigment-dispersed aqueous recording liquid suitable as an ink jet recording liquid or a handwriting recording liquid, and also relates to a printed material.

Ink jet recording has a high resolution, and it is therefore used as a printing method for a photographic tone digital image. Most of photographic tone ink jet recordings for domestic or office uses include a method of printing an aqueous recording liquid using a dye as a coloring material by ink jet system on a paper or a film (both of which are referred to as a printing paper) having a surface smoothly coated with a resin or an inorganic material. A dye has been used for a long time as a coloring material for an ink jet recording liquid since it is hardly solidified during long term storing of a recording liquid or it hardly clogs a nozzle of an ink jet printer. Also, since the dye can relatively uniformly dye a coat layer of an ink jet printing paper, it colors without damaging a glossy feeling derived from the smoothness of the coat layer and provides a printed material having a glossy feeling.

However, an ink jet-printed paper printed with an aqueous recording liquid using a dye as a coloring material is poor in water resistance, weather resistance and light resistance.

Therefore, in order to improve an ink jet recording liquid, a pigment has been used as a coloring material excellent in water resistance, weather resistance and light resistance to improve water resistance, weather resistance and light resistance of a printed material. However, the recording liquid using a pigment tends to be denatured and to degrade storage stability due to agglomeration and settling of the pigment, and also tends to clog an ink jet nozzle.

Also, a pigment causes problems that when a pigment is penetrated into a coat layer of an ink jet printing paper, gloss is good but a color-developing property is not good as compared with a dye, and that when the pigment is solidified to form a pigment layer on the coat layer, a color-developing property is good but glossy feeling is bad. Also, it has been tried to improve gloss by adding a water-soluble resin of styrene derivative or the like (see, for example, JP-A-6-116522 and JP-A-2002-20673), but when such a water-soluble resin is added, a solid content becomes large and a viscosity is raised, thereby disturbing ejection of ink and degrading storage stability.

Also, in order to solve such problems in respect of viscosity increase and storage stability, it has been proposed to use a urethane type resin as a water-soluble resin (see, for example, JP-A-6-279718, JP-A-7-82516 and JP-A-10-168151). For example, JP-A-6-279718 proposes an ink jet recoding liquid, wherein printing performance and abrasion resistance are improved and clogging of an ejecting nozzle is prevented by using a urethane type resin having a molecular weight of at most 5,000 and having a specific functional group such as a carboxyl group introduced therein.

Further, JP-A-7-82516 proposes a intermediate transferring type ink jet recording liquid having printing performance and abrasion resistance improved by using a volatile alkali material and a colloidal dispersion resin such as a urethane resin.

Still further, JP-A-10-168151 discloses to use an aqueous recording liquid containing a urethane type resin having a high acid value of 100 to 250 mgKOH/g obtained from carboxylated diol and polyisocyanate as a printing method using ink jet. It proposes to form a high density image having no blur by using such a recording liquid.

As described above, as a result of many trials, there has been produced an aqueous recording liquid having a pigment dispersed, which has storage stability, does not clog a nozzle, and provides water resistance, weather resistance and light resistance on a printed material. For example, as a black recording liquid, there are enumerated HP51645A of Hewlett-Packard, BCI-3eBK of CANON, ICBK23 and ICMB23 of Seiko Epson, FPB-BK of Roland (type numbers) and the like.

However, according to the present techniques represented by these recording liquids, it has been difficult to provide a photographic tone recording liquid which produces both photographic tone blackness and glossy feeling on a printed material aiming at a photographic image quality printing paper and which gives abrasion resistance on a printed surface. Thus, in order is to aim at a photographic image quality printing paper and to provide photographic tone blackness and gloss, there have been sold ink jet printing papers such as PM photographic paper, photoprofessional, QP photographic paper or the like. They have an ink-receiving layer comprising a porous layer having pores of at most nanometer scale or an ink-receiving layer having a swelling type polymer coated on at least one side of printing media, and have such a smoothness on the surface as a photographic paper, but a pigment type ink has not imparted satisfactory glossy feeling and blackness to these photographic image quality printing papers having these ink-receiving layer surfaces.

An object of the present invention is to provide an aqueous recording liquid having a pigment dispersed, which gives storage stability, does not clog a nozzle, imparts satisfactory water resistance, weather resistance and light resistance to a printed paper, provides both photographic tone blackness and glossy feeling on a printed material aiming at media having a smooth surface, and also imparts quite high abrasion resistance to a printed surface.

The present inventors have intensively studied with regard to a water-soluble high molecular material added for the purpose of dispersion stability of a pigment and for improving gloss of a printed material or abrasion resistance of a recording liquid. As this result, it has been discovered that viscosity increase of an aqueous dispersion can be prevented and dispersion stability of a pigment can be maintained by using a urethane type resin having a hydrolyzable group such as an ester bond or an amide bond in a much smaller amount, e.g. having a polyurethane urea part in a smaller amount, but having a relatively high molecular weight exceeding 5,000, and also even by using this resin in a large amount to a pigment (e.g. at least 60 parts by weight to 100 parts of a pigment) to improve abrasion resistance.

Further, it has been discovered that when a dispersed particle size of a pigment dispersed in a pigment dispersed aqueous liquid using such a urethane type resin is within a specific range, the pigments remained on the surface of a printed material printed by such a recording liquid are densely aligned, and gloss and abrasion resistance of the printed material become remarkably satisfactory.

Thus, the essential features of the present invention reside in:

(1) a pigment-dispersed aqueous recording liquid containing at least a pigment and a resin, which comprises from 60 to 200 parts by weight of the resin to 100 parts by weight of the pigment, wherein at least one of the resin is a water-dispersible urethane type resin, a weight fraction of a polyurethane urea part of which is at most 2.0 wt % to the urethane resin, and the pigment dispersed in the recording liquid has a dispersion particle size D50 of from 40 to 100 nm;

(2) the pigment-dispersed aqueous recording liquid according to the above feature (1), wherein the pigment includes at least a carbon black having a DBP absorption amount of from 30 ml/100 g to 100 ml/100 g;

(3) the pigment-dispersed aqueous recording liquid according to the above feature (1) or (2), wherein the urethane type resin has a weight average molecular weight of higher than 5,000. but not higher than 100,000;

(4) the pigment-dispersed aqueous recording liquid according to any one of the above features (1) to (3), wherein an acid value as a free acid of the urethane type resin is from 20 mgKOH/g to 100 mgKOH/g;

(5) the pigment-dispersed aqueous recording liquid according to any one of the above features (1) to (4), wherein the resin includes a resin having an acid value of at least 50 mgKOH/g as a free acid in addition to the water-dispersible urethane type resin;

(6) the pigment-dispersed aqueous recording liquid according to any one of the above features (1) to (5), wherein a solid-printed part having 14.5 mg per square inch of a pigment-dispersed aqueous recording liquid printed by ink jet recording system on a photographic image quality paper provides a printed thickness of at least 20 nm, an optical density of at least 2 and a 20° gloss value of at least 60;

(7) the pigment-dispersed aqueous recording liquid according to any one of the above features (1) to (6), wherein the pigment includes a carbon black and a pigment other than the carbon black;

(8) the pigment-dispersed aqueous recording liquid according to the above feature (7), wherein the pigment other than the carbon black is a cyan pigment;

(9) a printed material printed with a pigment-dispersed aqueous recording liquid as defined in any one of the above features (1) to (8);

(10) the printed material according to the above feature (9), wherein the printing is carried out by ejecting a pigment-dispersed aqueous recording liquid by an ink jet nozzle on a material to be recorded;

(11) the printed material according to the above feature (9) or (10), which has a printed thickness of at least 20 nm, an optical density of at least 2 and a 20° gloss value of at least 60;

(12) the printed material according to any one of the above features (9) to (11), which has an arithmetic average roughness of at most 0.04:

(13) the printed material according to any one of the above features (9) to (12), wherein the pigment-dispersed aqueous recording liquid contains at least a carbon black and the printed material is a black printed material;

(14) a pigment-dispersed aqueous recording liquid wherein a solid-printed part having 14.5 mg of ink per square inch printed by ink jet recording system on a photographic image quality paper provides a printed thickness of at least 20 nm, an optical density of at least 2 and a 20° gloss value of at least 60;

(15) the pigment-dispersed aqueous recording liquid according to the above feature (14), which contains at least a carbon black;

(16) a printed material printed by ejecting a pigment-dispersed aqueous recording liquid through an ink jet nozzle on a material to be recorded, which provides a printed thickness of at least 20 nm, an optical density of at least 2 and a 200 gloss value of at least 60; and

(17) the printed material according to the above feature (16), wherein at least 14.5 mg per square inch of ink is deposited on a photographic image quality paper by solid-printing.

Hereinafter, the present invention is described in more details.

Firstly, a pigment used in the preset invention is described. The pigment usable in the present invention is not specially limited, but may be any one of an organic pigment and an inorganic pigment. Their examples are illustrated below.

In the present invention, a black pigment, particularly a carbon black, is used as a pigment excellent in blackness, gloss, and other performances. A usable carbon black is not specially limited, but includes acetylene black, channel black, furnace black, and the like. Among them, channel black and furnace black have preferably high blackness, and furnace black is particularly preferable.

In view of printing grade, the above-mentioned carbon blacks preferably have a DBP absorption amount of generally from 30 ml/100 g to 100 ml/100 g, more preferably from 50 ml/100 g to 80 ml/100 g. If the DBP absorption amount is less than 30 ml/100 g, it is hardly dispersible, and if the DBP absorption amount is more than 100 ml/100 g, its dispersed particle size becomes finally large and a gloss of printed material is lowered. Since a carbon black having a large DBP absorption amount has a structure well developed, pulverization can not be effected smaller than the structure even when it is tried to be pulverized smaller.

A volatile content of carbon black is generally at most 8 wt %, preferably at most 6 wt %. pH is generally from 1 to 11, and in view of storage stability of a recording liquid, it is preferably from 3 to 10, more preferably from 6 to 9. A BET specific surface area is generally at least 100 $m^2/g$, preferably from 150 to 600 $m^2/g$, more preferably from 260 to 500 $m^2/g$. If the specific surface area is too small, blackness is lowered since an area absorbing light becomes small, and if the specific surface area is too large, ejection of ink is not satisfactorily effected since an amount of a dispersant necessary for dispersion becomes large. A primary particle size is generally at most 30 nm, preferably at most 20 nm, more preferably at most 16 nm, most preferably at most 15 nm.

The DBP absorption amount is a value measured in accordance with JIS K6221 A method, the volatile content is a value measured in accordance with JIS K6221, and the primary particle size is a value of arithmetic average particle size (number average) measured by an electron microscope.

Examples of the above-mentioned carbon blacks include #2650, #2600, #2300, #2200, #1000, #980, #970, #966, #960, #950, #900, #850, MCF-88, #55, #52, #47, #45 #45L, #44, #33, #32, #30 (manufactured by Mitsubishi Chemical Corporation), Special Black4A, 550, Printex 95, 90, 85, 80, 75, 45, 40 (manufactured by Degussa Co., Ltd.), Rega 1660, Rmogul L, monarch 1400, 1300, 1100, 800, 900 (manufactured by Cabot Co., Ltd.), Raven 7000, 5750, 5250, 3500, 3500, 2500 ULTRA, 2000, 1500, 1255, 1200, 1190 ULTRA, 1170, 1100 ULTRA, Raven 5000 UIII (manufactured by Columbian Co., Ltd.), and the like.

Examples of a yellow pigment include C.I. Pigment Yellow 1, 2, 3, 12, 13, 14, 16, 17, 73, 74, 75, 83, 93, 95, 97, 98, 114, 128, 129, 151, 154 and the like.

Also, examples of a magenta pigment include C.I. Pigment Red 5, 7, 12, 48(Ca), C.I. 48(Mn), 57(Ca), 57:1, 112, 123, 168, 184, 202 and the like.

Examples of a cyan pigment include C.I. Pigment Blue 1, 2, 3, 15:3, 15:4, 16, 22, 60, 4, 60 and the like.

In addition to the above pigment, C.I. Pigment Red 209, 122, 224, 177, 194, C.I. Pigment Orange 43, C.I. Pigment Violet 19, 23, 37, C.I. Pigment Green 36, 7, C.I. Pigment Blue 15:6, 209 and the like are usable.

Also, in the present invention, a pigment used is not limited to one pigment but may be used in combination with one or more of the above pigments.

The present invention provides a particularly excellent performance if it is used as a black pigment-dispersed aqueous recording liquid. It is particularly preferable to use a carbon black in the black pigment-dispersed aqueous recording liquid among the above-mentioned pigments. Also, in addition to a carbon black, by using other pigments in combination therewith, a black color printed material having a satisfactory bluish color can be obtained. The pigment to be combined is preferably a cyan pigment, particularly C.I. Pigment Blue 15:3.

Also, the pigments used in the pigment-dispersed aqueous recording liquid (sometimes hereinafter simply referred to as "recording liquid") of the present invention may be chemically treated (oxidation treatment, fluorination treatment or the like), or may be physically or chemically bonded with a dispersant, a surfactant or the like (graft-modification treatment, adsorption with a dispersant before dispersing or the like). Examples of the pigments thus treated include Cab-o-jet 200 or Cab-o-jet 300 (manufactured by Cabot co., Ltd.), and the like.

Next, a urethane type resin used in the present invention is explained hereinafter.

The urethane type resin is a high molecular material, the main chain of which has a polyurethane structure bonded with a urethane bond, and includes a well known urethane resin.

In the present invention, it is particularly preferable to use a water-dispersible urethane resin among the urethane type resin. Such a water-dispersible urethane resin is generally one having a hydrophilic component necessary for stably dispersing in water introduced into the main chain of a polyurethane structure or a water dispersion of polyurethane obtained by dispersing with an outside emulsifier, but a self-dispersible type (self-emulsifiable type) polyurethane having a hydrophilic component introduced into the main chain is more preferable. It may be in any form of colloidal dispersion, emulsion, suspension or slurry.

Examples of the urethane type resin used in the present invention include preferably various water-dispersible urethane type resins (ester type urethane resin, ether type urethane resin, carbonate type urethane resin and the like) obtained by reacting a diisocyanate compound, a diol compound such as polyether diols, polyester diols, polycarbonate diols or the like, and a diol containing an acid group such as a carboxylic acid group, a sulfonic acid group or the like.

Examples of the diisocyanate compound include an aliphatic diisocyanate compound such as hexamethylene diisocyanate, 2,2,4-trimethylhexamethylene diisocyanate or the like, an alicyclic diisocyanate compound such as isophorone diisocyanate, hydrogenated xylene diisocyanate, 1,4-cyclohexane diisocyanate, 4,4'-dicyclohexylmethane diisocyanate or the like, an arylaliphatic diisocyanate compound such as xylylene diisocyanate, tetramethylxylylene diisocyanate or the like, and an aromatic diisocyanate compound such as toluylene diisocyanate, phenylmethane diisocyanate or the like, and their modified materials of diisocyanates (such as carbodiimide, uretodion, uretoimine-containing modified products).

Examples of the diol compound include a polyether diol such as polyethylene glycol, polypropylene glycol, polytetramethylene ether glycol, polyhexamethylene ether glycol or the like, a polyester diol such as polyethylene adipate, polybutylene adipate, polyneopentyl adipate, poly-3-methylpentyl adipate, polyethylene/butylene adipate, polyneopentyl/hexyl adipate or the like, a polylactone diol such as polycaprolactone diol or the like, and a polycarbonate diol. In view of storage stability of ink, it is preferable to use a diol compound of polyether type, polyester type or polycarbonate type, more preferably polyether type or polycarbonate type, most preferably polyether type. The polyether type or polycarbonate type diol compound has a satisfactory storage stability since it is hardly denatured by hydrolysis.

Examples of the acid group-containing diol include dimethylolacetic acid, dimethylolbutanoic acid, dimethylolpropionic acid, dimethylolbutyric acid and the like. Particularly, dimethylolbutanoic acid is preferable.

Examples of a method for preparing a urethane type resin include a solution method which comprises preparing an isocyanate-terminated prepolymer in a low boiling solvent (such as acetone) unreactive with an isocyanate group, introducing a hydrophilic group such as diamine or polyol therein, effecting phase change by diluting with water, and distilling off a solvent to obtain a polyurethane dispersion, a prepolymer method which comprises preparing an isocyanate group-terminated prepolymer having a hydrophilic group introduced, dispersing in water, and extending a chain with an amine, other hot melt method, a method of using water medium as a chain extender of a urethane prepolymer in an emulsifier aqueous solution, a method which comprises a step of sulfonating an aromatic ring of a urethane prepolymer having a free isocyanate group obtained from an aromatic polyisocyanate and a hydrophobic polyol, a method of using a block isocyanate, and other well known methods, but should not be limited thereto.

Particularly, a urethane type resin may be prepared by the prepolymer method, and a polyhydroxy compound having a low molecular weight may be used at that time. Examples of the polyhydroxy compound having a low molecular weight include the above illustrated starting materials of the polyester diol, such as glycol and alkylene oxide-low mol adduct, a trihydric alcohol such as glycerin, trimethylolethane or trimethylolpropane, its alkylene oxide-low mol adduct, and the like.

In case of an aqueous type urethane resin, it is generally known to use a method which comprises effecting phase change of a urethane polymer prepared in an organic solvent phase and emulsifying to further extend a chain in an aqueous phase. It is usual to use polyamines such as diamine as a chain extender at that time. For example, the urethane prepolymer is subjected to neutralization of an acid group derived from dimethylolalkanoic acid and chain extension with water or di- or triamine after or while neutralizing. Examples of the polyamines used as a chain extender in the amine extension include generally diamine or triamine. Their particular examples include hexamethylenediamine, isophoronediamine, hydrazine, piperazine and the like.

However, it has been found that storage stability of a recording liquid containing a urethane type resin prepared by using polyamines as a chain extender tends to be poor. This is because a urethane resin (a polyurethane resin containing a polyurethane urea part) having a chain extended with an amine tends to be hydrolyzed, and it is further considered that polyamines formed by hydrolysis also works as an agglomerating agent in the pigment-dispersed recording liquid, thus causing double bad influences.

One of the essential features of the present invention is to use a urethane type resin in which a weight fraction of a polyurethane urea part in the urethane type resin is at most 2.0 wt %. A satisfactory recording liquid having an excellent storage stability can be obtained by using such a specific urethane type resin, having the resin present in a specific ratio to a pigment and employing a pigment having a dispersed particle size in such a specific range as described below. The ink jet recording liquid thus obtained maintains stably excellent physical properties, and can be satisfactorily printed by ejecting under severe strict conditions. Also, the stability of pigment dispersion state at the time of drying a photographic image quality printing paper surface is improved (prevention of agglomeration), thereby providing a satisfactory smoothness of the surface, a resin gloss of a polymer of the main urethane type resin, and both satisfactory gloss and blackness improved in an ink-receiving layer of the photographic image quality printing paper surface due to uniform presence of the pigment within a film having a satisfactory film-formability. Thus, it is considered that the pigment is satisfactorily dispersed in such a stable state as to achieve high optical performances and the urethane type resin itself contributes to the improved gloss.

A weight fraction of polyurethane urea part in a urethane type resin is at most 2.0 wt %, preferably at most 1.8 wt %, more preferably at most 1.5 wt %, most preferably at most 1.0 wt %, and it is further preferable not to contain a substantial amount of the polyurethane urea part.

Such a desired polyurethane type resin having an aimed molecular weight can be prepared by not using a chain extender such as a polyamine in a conventional well known preparation method. Also, it is preferable to carry out the preparation of a polyurethane type resin under substantially anhydrous conditions. This is to prevent a polyisocyanate compound as a starting material for a urethane type resin from reacting with water content to produce a polyamine. Thus, this is to avoid the production of a polyurethane urea part.

A weight fraction of a polyurethane urea part in the urethane type resin, i.e. a chain-extended part such as diamines introduced by an amine extender, can be determined from a weight ratio of polyamines in the starting materials charged in the preparation of the urethane type resin used in the present invention. For example, the weight ratio can be determined by dividing the weight of polyamines by the total weight of all starting materials used in the preparation of the polyurethane type resin.

Heretofore, when a pigment type ink was used on a photographic image quality printing paper having a glossy surface, the gloss was lowered since fine agglomeration of the pigment was caused on the glossy surface. However, according to the present invention, the agglomeration of a pigment is prevented and a satisfactory dispersion state is maintained on the surface of a paper to be recorded, thereby providing improved gloss and blackness.

In the present invention, it is preferable to use a polyether type urethane resin as a urethane type resin, particularly from viewpoints of stability of ink and gloss of a printed material.

A urethane type resin may be used in a form of an alkali metal salt of Li, Na or K, or in a form of an organic amine salt of ammonia, dimethylamine, (mono-, di-, tri-)ethanolamine or the like. They can be obtained by further neutralizing a urethane type resin obtained by the above-mentioned methods. A base used for this neutralization may be optionally selected depending on a counter ion or the like of a desired salt, and their examples include an alkylamine such as butylamine or triethylamine, an alkanolamine such as monoethanolamine, diethanolamine or triethanolamine, morpholine, ammonia, or an inorganic base such as sodium hydroxide or the like.

In order to improve storage stability and ejecting stability of a recording liquid, the lower limit of an acid value of a free acid of the above urethane type resin used in the present invention is preferably at least 20 mgKOH/g, more preferably at least 30 mgKOH/g, more further preferably at least 50 mgKOH/g, most preferably at least 60 mgKOH/g.

Also, the upper limit of an acid value is preferably at most 200 mgKOH/g, more preferably at most 100 mgKOH/g, most preferably at most 85 mgKOH/g, particularly at most 70 mgKOH/g. If the lower limit of an acid value is lower than 15 mgKOH/g, water-solubility is lost, and it the upper limit of an acid value exceeds 200 mgKOH/g, abrasion resistance and water resistance of a coated film are lowered and a viscosity becomes too high, thereby sometimes causing a problem of unsatisfactory ejecting performance. Also, in order to maintain a satisfactorily stable ejecting performance, a weight average molecular weight of the above high molecular material is usually at most 300,000, preferably at most 100,000, more preferably at most 50,000, most preferably at most 30,000. On the other hand, the lower limit of the weight average molecular weight is usually higher than 5,000, preferably at least 8,000, more preferably at least 10,000, most preferably at least 12,000. If the molecular weight is too high, a viscosity becomes high, thereby lowering an ejecting performance.

On the other hand, if the molecular weight is at most 5,000, the urethane type resin tends to become greatly water-soluble, and a gloss-imparting effect is lowered. Also, liquid stability tends to be lowered.

Further, in addition to the above urethane type resin, it is preferable to use other various water-soluble resins in combination therewith. Typical examples of such a water-soluble resin include an anionic water-soluble high molecular material.

In view of storage stability of a recording liquid, the anionic water-soluble high molecular material in a free acid form has an acid value of generally at least 40 mgKOH/g, preferably at least 50 mgKOH/g, more preferably at least 100 mgKOH/g, most preferably at least 150 mgKOH/g. If the acid value is lower than 40 mgKOH/g, an electrostatic repulsing force derived from a functional group of a resin adsorbed on a pigment becomes small, thereby degrading dispersion and dispersion stability. Also, a copolymer having a hydrophobic group is preferable in view of dispersion stability of carbon black, and water resistance and abrasion resistance of a printed material.

Examples of the hydrophobic group in a high is molecular material include an organic group having an aromatic ring such as a phenyl group, a benzyl group or a naphthyl group which may be substituted, and an alkyl group, an alkenyl group, an alkynyl group or a cycloalkyl group, which has a carbon number of at least 4 and may be branched or substituted, and among them, an organic group having an aromatic ring is preferable.

Concrete examples of the anionic water-soluble high molecular material used in the present invention include (α-methyl)styrene/maleic acid copolymer, (α-methyl)styrene/(meth)acrylic acid copolymer, (α-methyl)styrene/(meth)acrylic acid ester/(meth)acrylic acid copolymer, (meth)acrylic acid ester/(meth)acrylic acid copolymer, (meth)acrylic acid ester/maleic acid copolymer and/or their salts, and preferable examples include (α-methyl)styrene/(meth)acrylic acid copolymer. In the present specification, "(α-methyl)styrene" means "α-methylstyrene and/or styrene", and "(meth)acrylic acid" means "methacrylic acid and/or acrylic acid".

The anionic water-soluble high molecular material used herein may be any of a block polymer, a graft polymer and a random polymer, but in view of a manufacturing cost, a graft polymer or a random polymer is preferable, and particularly a random polymer is preferable. Also, in view of ejecting stability, their weight average molecular weight is preferably at most 50,000, more preferably at most 15,000, most preferably at most 10,000. If the molecular weight becomes too high, a viscosity becomes high and an ejecting performance becomes poor. Further, a copolymer having an acid value of at least 150 mgKOH/g may be used in a form of an alkali metal salt of Li, Na or K, or an organic amine salt of ammonia, dimethylamine or (mono-, di-, tri-)ethanolamine.

Examples of commercially available products of the above high molecular material or high molecular material solution include "Johncryl 67", "679", "680", "682", "683", "690" and/or their salts, "Johncryl 52", "57", "60", "62", "63", "70", "354", "501", "6610", and the like, manufactured by Johnson Polymer Co., Ltd.

A medium used for a recording liquid of the present invention is usually an aqueous medium containing water as the main component, but it is preferable to have a water-soluble organic solvent added to water.

The above water-soluble organic solvent is classified into one having a function as a moisture-retaining agent and one having a function as a penetrating solvent.

Examples of the former material as a moisture-retaining agent include ethylene glycol, propylene glycol, 1,3-propanediol, diethylene glycol, triethylene glycol, polyethylene glycol (particular examples: "#200", "#300", "#400", "#4000" and "#6000" manufactured by Wako Pure Chemical Industries, Ltd.), glycerin, 2-pyrrolidone, N-methyl-2-pyrrolidone, 1,3-dimethylimidazolinone, thiodiglycol, sulfolane, dimethylsulfoxide, neopentyl alcohol, trimethylolpropane, 2,2-dimethylpropanol, and the like.

Examples of the penetrating solvent (penetrating assistant) include ethylene glycol monomethyl ether, ethylene glycol dimethyl ether, ethylene glycol monoethyl ether, ethylene glycol diethyl ether, ethylene glycol mono-n-propyl ether, ethylene glycol monoisopropyl ether, ethylene glycol mono-n-butyl ether, ethylene glycol mono-sec-butyl ether, ethylene glycol monoisobutyl ether, ethylene glycol mono-tert-butyl ether, ethylene glycol mono-n-amyl ether, ethylene glycol mono-n-hexyl ether, propylene glycol monomethyl ether, propylene glycol dimethyl ether, propylene glycol monoethyl ether, propylene glycol diethyl ether, propylene glycol mono-n-propyl ether, propylene glycol monoisopropyl ether, propylene glycol mono-n-butyl ether, propylene glycol mono-sec-butyl ether, propylene glycol monoisobutyl ether, propylene glycol mono-tert-butyl ether, diethylene glycol monomethyl ether, diethylene glycol dimethyl ether, diethylene glycol monoethyl ether, diethylene glycol mono-n-propyl ether, diethylene glycol monoisopropyl ether, diethylene glycol mono-n-butyl ether, diethylene glycol mono-sec-butyl ether, diethylene glycol monoisobutyl ether, diethylene glycol mono-tert-butyl ether, dipropylene glycol monomethyl ether, dipropylene glycol monoethyl ether, dipropylene glycol mono-n-propyl ether, triethylene glycol mono-n-butyl ether, polyethylene glycol monopropyl ether, polyethylene glycol monobutyl ether, ethylene glycol adduct of glycerin (particular examples: "Liponic EG-1" manufactured by Lipochemical Co., Ltd.), and the like.

These organic solvents may be used respectively alone or in a mixture of two or more.

Also, in order to enhance the penetrating property of a recording liquid, various surfactants may be used for the recording liquid of the present invention. Examples of the surfactants include various surfactants such as an anionic surfactant, a nonionic surfactant, a cationic surfactant or an amphoteric surfactant.

Examples of the nonionic surfactant include aliphatic acid salts, alkylsulfuric acid ester salts, alkylbenzenesulfonic acid salts, alkylnaphthalenesulfonic acid salts, alkylsulfosuccinic acid salts, alkyldipbenyletherdisulfonic acid salts, alkylphosphoric acid salts, polyoxyethylenealkylsulfuric acid ester salts, polyoxyethylenealkylarylsulfuric acid ester salts, alkanesulfonic acid salts, naphthalenesulfonic acid formalin condensates, polyoxyethylenealkylphosphoric acid esters, N-methyl-N-oleoyltaurinic acid salts, α-olefinsulfonic acid salts, and the like.

The nonionic surfactant is not specially limited, but one having an ethylene oxide structure or a propylene oxide structure is preferable in view of storage stability and printing density, and among them, one having an NLB value of from 9 to 17, particularly from 10 to 16, is more preferable.

Particular examples of the nonionic surfactant include polyoxyethylene nonyl phenyl ether, polyoxyethylene octyl phenyl ether, polyoxyethylene alkyl ether, polyoxyethylene lauryl ether, polyoxyethylene oleyl ether, polyoxyethylene tridecyl ether, polyoxyethylene cetyl ether, polyoxyethylene stearyl ether, polyoxyethylene alkylamine, aminopolyoxyethylene, sorbitan aliphatic acid ester, polyoxyethylene sorbitan laurate, polyoxyethylene sorbitan palmitate, polyoxyethylene sorbitan stearate, polyoxyethylene sorbitan oleate, naphtholethylene oxide adduct, acetylene glycol ethylene oxide adduct, bisphenol A ethylene oxide adduct, oxyethylene oxypropylene block polymer, sorbitan aliphatic acid ester, polyoxyethylene sorbitan aliphatic acid ester, polyoxyethylene sorbitol aliphatic acid ester, glycerin aliphatic acid ester, polyoxyethylene aliphatic acid ester, polyoxyethylene alkylamine, α-olefin sulfonic acid salt, and the like. Commercially available products of the nonionic surfactant are usable, examples of which include Surfinol 440, Surfinol 465 and Surfinol 485 (manufactured by Air Products and Chemicals, Inc.), Acetylenol EH and Acetylenol EL (manufactured by Kawaken Fine Chemicals Co., Ltd.) and the like.

On the other hand, examples of the cationic surfactant and the amphoteric surfactant include alkylamine salts, quaternary ammonium salts, alkylbetaines, aminoxides, and the like.

A nonionic surfactant having a low molecular weight is used in an amount of usually from 0.1 to 3 parts by weight, preferably from 0.5 to 1 part by weight, to 100 parts by weight of a recording liquid. A surface tension of the recording liquid is appropriately controlled by a kind and an amount of the nonionic surfactant of a low molecular weight, but the surface tension of the recording liquid of the present invention is preferably from 25 dyne/cm to 54 dyne/cm. If the surface tension exceeds 54 dyne/cm, a penetrating speed of the recording liquid into a material to be recorded becomes too slow, and consequently a printing speed must be made lower. On the other hand, if the surface tension of the recording liquid is smaller than 25 dyne/cm, a penetrating speed of the recording liquid into a material to be recorded becomes too high, and consequently a satisfactory printing density can not be obtained.

The composition of the recording liquid may be made into an ink composition having a satisfactory penetrating property to recording media and also having an excellent continuous ejecting stability by incorporating a surfactant having an acetylene bond therein, for example, as illustrated in JP-A-2001-302,950. Also, a propylene oxide adduct of a lower alcohol may be added thereto in combination therewith. Further, as illustrated in JP-A-2000-3,760, a specific compound having an acetylene bond, 1,5-pentanediol, a butylether type solvent or the like may be contained therein.

Still further, as illustrated in JP-A-2000-30,237, it is possible to prepare an ink composition containing an acetylene glycol type surfactant and/or a polysiloxane type surfactant, an alkyl ether derivative of a polyhydric alcohol having an alkyl group having a carbon number of at least 3 (preferably from 3 to 6) as an organic solvent and/or a 1,2-alkanediol, which is a satisfactory ink composition excellent in color reproducibility and having a high penetrating property and a short drying time.

In addition to the above components, the recording liquid of the present invention may further contain a mildew-proofing agent, a fertilizer, a pH adjusting agent, urea or the like, if necessary. Particularly, examples of a pH adjusting agent, a solubility accelerating agent and an antioxidant include an alkanolamine such as diethanolamine, triethanolamine or the like.

A method for preparing the recording liquid of the present invention is not specially limited, but may be a well known method, and its examples include a method (master batch method) which comprises obtaining a high concentration dispersion by dispersing the above pigment in the presence of the above necessary water-soluble resin and the above necessary additives in a medium, and then further adding the above urethane type resin and the above necessary additives and medium to the dispersion thus obtained, thereby adjusting a concentration to prepare a recording liquid, or a method which comprises dispersing the above pigment in the presence of the above respective resin components and the above necessary additives in a medium to prepare a recording liquid. The above master batch method is efficient in respect of carrying out the dispersing treatment at a high concentration and adjusting the dispersed particle sizes to a desired size.

Examples of a dispersing machine used for the dispersing treatment include a dispersing machine using media and a dispersing machine without using media. Examples of the dispersing machine using media include a ball mill, a sand mill, a dynomill, a DCP mill and the like. Examples of the dispersing machine without using media include a roll mill, an ultrasonic dispersing machine and the like, and in addition to these dispersing machines, other well known dispersing machines may be used.

In the present invention, it is preferable to remove coarse particles by a filtering device or a centrifugal separator after pulverizing and dispersing treatments by the above dispersing machines.

A pigment is used in an amount of preferably from 0.1 to 10 wt %, more preferably from 0.2 to 5 wt %, most preferably from 1 to 4 wt %, to the total weight of the recording liquid. If the amount of the pigment is less than 0.1 wt %, coloring becomes poor, and if the amount of the pigment exceeds 10 wt %, a viscosity becomes too high and a gloss becomes poor. A water-soluble resin (typically the above water-soluble anionic high molecular material other than a specific urethane type resin which is the essential component of the present invention) is used in an amount of preferably from 5 to 100 parts by weight (in terms of solid content), more preferably from 10 to 50 parts by weight, to 100 parts by weight of a pigment.

A urethane type resin is used in an amount of preferably from 60 to 200 parts by weight (in terms of solid content), more preferably from 70 to 150 parts by weight, to 100 parts by weight of a pigment.

The total amount of these resins is from 60 to 200 parts by weight (in terms of solid content), preferably from 70 to 150 parts by weight, to 100 parts by weight of a pigment. If the resin amount is too small, stability of the recording liquid becomes poor, and the resin amount is too large, a viscosity becomes high, thereby degrading an ejecting property and deteriorating a gloss of a printed material. Thus, the above-mentioned range is an appropriate range. Also, a water-soluble organic is solvent in the above recording liquid is used in an amount of from 5 to 30 wt %, but in view of storage stability, this amount is preferably from 5 to 20 wt %, more preferably from 8 to 20 wt %.

One kind of these pigments, resins, additives and organic solvents may be used respectively alone, but two or more kinds of these respective components may be used in combination to further improve physical properties.

Also, in view of dispersion stability, ejecting stability and printed material quality, it is preferable to adjust an average dispersion particle size of a pigment in the recording liquid in a range of from 40 to 100 nm, more preferably from 50 to 85 nm. Further, in view of dispersion stability and ejecting stability, it is preferable to adjust the maximum dispersion particle size of a pigment to at most 5 µm, more preferably at most 1 µm.

Measurement of an average dispersion particle size and a particle size distribution of a pigment in the recording liquid of the present invention is made by a particle size analyzer by light scattering method ("Microtrac UPA150" manufactured by Nikkiso Co., Ltd.), and D50 (D50 indicates a particle size wherein 50% of particles have at most this particle size) in the particle size distribution is an average dispersion particle size value of the recording liquid. A maximum dispersion particle size is a value of minimum particle size among particle sizes wherein a dispersion particle having a particle size larger than this particle size is not present.

The recording liquid of the present invention is used not only for ink jet recording and writing tools but also for other uses. However, the recording liquid of the present invention is particularly suitable for ink jet recording, i.e. a method for forming a printed material (printing) on a material to be recorded by ejecting from an ink jet nozzle.

A material to be recorded is classified into a plain paper having a mono-layer structure comprising cellulose, a loading material, a sizing agent and the like and a special printing paper having a multi-layer structure comprising an ink-receiving layer provided on at least one side of a substrate, but the recording liquid of the present invention is usable for all of materials to be recorded, which include a plain paper, a recycle paper, an ink jet printing paper (coat paper, glossy paper or the like), an ink jet printing film (coat film, glossy film or the like), an OHP film and the like. Among them, the recording liquid of the present invention can be satisfactorily used for a recording material developed for obtaining a photographic image quality, such as a recording material having an ink-receiving layer comprising a porous layer of at most nanometer scale provided on at least one side of a printing medium or having an ink-receiving layer formed by coating a swelling type polymer on at least one side of a printing medium (photographic image quality paper), thereby enabling printing having a satisfactory gloss and a high optical density (OD) value.

When printing by ink Jet system on such a photographic image quality paper, it is preferable that a photographic tone-printed material provides a photographic tone gloss feeling by visual evaluation, which has a 20° gloss of preferably at least 60, more preferably at least 65, most preferably at least 70. A printed material providing such a gloss preferably has an arithmetic average roughness Ra of at most 0.04 μm, particularly at most 0.03 μm. Also, in order to obtain a clear image having a high contrast, it is preferable that a printed material has a printed density (OD) of at least 2, more preferably at least 2.2, most preferably at least 2.3. Also, in order to achieve such a high OD, a printing film thickness is preferably at least 20 nm, more preferably at least 100 nm, most preferably at least 150 nm, particularly at least 200 nm. On the other hand, if the printing film thickness is too thick, it has been discovered that the gloss of the printed surface tends to be lowered. Thus, it is preferable that the printing film thickness is at most 300 μm, more preferably at most 250 nm. Particularly, it is desirable that a printed material having an ink deposited in an amount of at least 14.5 mg per square inch by solid-printing satisfies these conditions.

Also, when the recording liquid providing such a photographic tone-printed material is solid-printed in an ink amount of at least 14.5 mg per square inch on a photographic image quality printing paper, it is preferable that the printed material has a printing film thickness of at least 20 nm, an OD value of at least 2.0 and a 20° gloss of at least 60.

Further, it is preferable that a recording liquid provides a printing film thickness of at least 100 nm, more preferably at least 150 nm, most preferably at least 200 nm, on the printed material. Also, it is preferable that the printing film thickness is at most 300 nm, more preferably at most 250 nm, and that the printing film thickness is from 100 to 300 nm, more preferably from 150 to 200 nm. Further, it is preferable that the recording liquid provides a printed material having an OD value of at least 2.2, more preferably at least 2.3. Still further, it is preferable that the recording liquid provides a printed material having a 20° gloss of at least 65, more preferably at least 70. Also, it is preferable that the recording liquid provides a printed surface having an arithmetic average roughness Ra of at most 0.04 μm, more preferably at most 0.03 μm.

In the present invention, the photographic image quality printing paper means a PM photographic paper manufactured by Seiko Epson Corporation, and particularly a material to be printed, which has a 20° gloss of at least 15 as a blank paper.

Also, the solid-printing for depositing 14.5 mg per square inch of ink is carried out by loading an ink into a printer MJ8000C manufactured by Seiko Epson Corporation and electing "Super Fine Mode" (with regard to "basic configuration" in the printer properties, "recommendation configuration" is elected as "mode configurations" and "superfine printing paper" is elected as "kinds of paper to be used").

Hereinafter, the present invention is further illustrated in more details with reference to Examples. The terms "part" and "%" are based on weight unless otherwise specified. Also, physical properties of carbon blacks used herein are illustrated in the following Table 1, and evaluation of obtained dispersions and printed materials and measurement methods of physical properties were carried out as illustrated in the following paragraphs (1) to (9).

TABLE 1

| | Nitrogen-adsorbing specific surface area (m²/g) | DBP absorption amount (ml/100 g) | pH |
|---|---|---|---|
| Carbon Black (A) manufactured by Mitsubishi Chemical Corporation | 395 | 77 | 7.6 |
| "MCF88" manufactured by Mitsubishi Chemical Corporation | 170 | 55 | 8 |
| "#45" manufactured by Mitsubishi Chemical Corporation | 115 | 53 | 8 |

(1) Measurement of Dispersion Particle Size Distribution

A dispersion or a recording liquid was diluted with ion-exchanged water, and its dispersion particle size distribution was measured by a particle size distribution meter ("Microtrac UPA150" manufactured by Nikkiso Co., Ltd.). A value of D50 (D50 indicates a value wherein 50% of particles have a size of at most this particle size) in the particle size distribution is an average distribution particle size.

(2) Measurement of Viscosity

A viscosity of a recording liquid was measured by an E type viscometer at 25° C.

(3) Storage Stability Test

A recording liquid was placed in a glass-made sampling bottle, and was maintained at 70° C. for 1 week in a sealed state to measure a dispersion particle size distribution. The storage stability was measured by a difference in D50 values before and after maintaining at 70° C. for 1 week.

○: An absolute value of a difference in D50 values before and after maintaining at 70° C. for 1 week is at most 2 nm.

Δ: An absolute value of a difference in D50 values before and after maintaining at 70° C. for 1 week is larger than 2 nm but at most 6 nm.

X: An absolute value of a difference in D50 values before and after maintaining at 70° C. for 1 week is larger than 6 nm.

(4) Printing Test

A recording liquid was loaded into a cartridge of an ink jet printer MJ8000C manufactured by Seiko Epson Corporation, and solid-printing was carried out on an ink jet printer photographic image quality glossy printing paper (PM photographic printing paper) by "superfine mode" to evaluate the printed materials on the basis of the following three standards.

○: A satisfactory printed material having no print-missing and no light brush-stroke is obtained.

Δ: There is substantially no problem although there is a slight print-missing.

X: Print-missing is remarkable.

(5) Measurement of Printing Density

A density (OD) of the printed materials obtained by the above printing test was measured by a Macbeth densitometer (RD914). A larger numerical value indicates a more satisfactory printing density, and a density of at least 2 is defined as a pass standard.

(6) Measurement of Gloss

The printed materials obtained by the above printing test were measured in respect of a 20° gloss by a gloss meter ("Microtriglossn" manufactured by BYK-Gardner). A larger value indicates a more satisfactory gloss, and a gloss value of at least 60 is judged as a pass standard.

(7) Measurement of Printing Film Thickness and Measurement of Printing Surface Roughness (Ra)

A liquid droplet was measured at an observation magnification of 2,000 times by using "Ultradepth configuration-measuring microscope VK-8500" manufactured by Keyence Corporation to measure a film thickness and a surface roughness.

(8) Visual Photographic Tone Evaluation

The printed materials obtained by the above printing test were visually evaluated in respect of photographic tone on the basis of the following four standards.
○: Glossy and black
Δ: Glossy but not black
X: Black but not glossy
XX: Not black and not glossy (9) Water Resistance Test The printed materials obtained in the above printing test were bathed in ion-exchanged water at 25° C. for one minute, and then presence or absence of blur was observed.
○: There is observed no blur.
X: There is observed blur.

(Preparation of Urethane Type Resin)

(1) Preparation of Urethane Type Resins (A) to (C)

① Preparation of Urethane Prepolymer

Urethane type resins (A) to (C) were prepared by the following method. Respective components as shown in the following Table 2 were reacted in an acetone solvent under $N_2$ stream to obtain a urethane prepolymer.

② Preparation of Aqueous Type Polyurethane Emulsion

The above obtained urethane prepolymer was dropwise added to deionized water containing 12 parts of triethylamine to be dispersed therein, and acetone was removed under reduced pressure to obtain a polyurethane emulsion. The polyurethane emulsion thus obtained had a solid content, a weight average molecular weight (Mw) and an acid value as shown in the following Table 2.

The weight average molecular weight was a value measured by GPC in terms of polystyrene calculation, and the acid value was measured in accordance with DIN53402.

(2) Preparation of Urethane Type Resin (D)

Urethane resin (D) was prepared in accordance with the following method. A urethane prepolymer was obtained by reacting such a monomer composition comprising a polyester polyol of neopentyl glycol, 1,6-hexanediol and adipic acid, dimethylolbutanoic acid, IPDI and TMXDI as shown in the following Table 2 in the same manner as in the above "① Preparation of urethane prepolymer" in "(1) Preparation of urethane type resins (A) to (C)". The urethane prepolymer thus obtained was dispersed in deionized water containing 8 parts of triethylamine, and 2.4 parts of 2-[(2-aminoethyl)amino]ethanol was dropwise added to be dispersed, and acetone was removed under reduced pressure to obtain a polyurethane emulsion. The polyurethane emulsion thus obtained had a solid content, a weight average molecular weight (Mw) and an acid value as shown in the following Table 2.

TABLE 2

|  | Polyurethane resin (A) | Polyurethane resin (B) | Polyurethane resin (C) | Polyurethane resin (D) |
| --- | --- | --- | --- | --- |
| Monomer composition | PTMEG: 35 parts Triethylene glycol: 3 parts Dimethylol propionic acid: 16 parts TMXDI: 9 parts IPDI: 25 parts | PTMEG: 35 parts Triethylene glycol: 3 parts Dimethylol butanoic acid: 17 parts TMXDI: 9 parts IPDI: 25 parts | Polyester: 35 parts Triethylene glycol: 3 parts Dimethylol butanoic acid: 17 parts TMXDI: 9 parts IPDI: 25 parts | Polyester: 35 parts Butanol: 3 parts Dimethylol butanoic acid: 17 parts TMXDI: 9 parts IPDI: 25 parts |
| Solid content (wt %) | 30 | 30 | 30 | 30 |
| Mw | 20,840 | 20,000 | 20,000 | 20,000 |
| Acid value (mgKOH/g) | 69 | 69 | 69 | 48 |

PTMEG: Polytetramethylene ether glycol
IPDI: Isophorone diisocyanate
TMXDI: Tetramethylene xylylene diisocyanate

EXAMPLE 1

Respective components as shown in the following Table 3 were dispersed by a beads mill dispersing machine using 0.8 mm of zirconia beads to obtain an average s dispersion particle size of 61.9 nm by monitoring its particle size distribution, and the dispersion thus obtained was subjected to a centrifugal separator and was filtrated by a 5 μm filter to remove coarse particles, thus obtaining a carbon black dispersion.

TABLE 3

| Components | Blending ratio (parts) |
| --- | --- |
| Styrene-acrylic acid type copolymer (25 wt % aqueous solution of potassium salt of "Johncryl 683" (acid value 160 mgKOH/g, Mw = 8000) manufactured by Johnson Polymer Co., Ltd.) | 10.4 |
| Ion-exchanged water | 71.5 |
| Glycerin | 5 |
| "Proxel GXL S" | 0.1 |

TABLE 3-continued

| Components | Blending ratio (parts) |
|---|---|
| "MCF88" manufactured by Mitsubishi Chemical Corporation | 13 |
| Total | 100 |

("Proxel GXL S" is an antiseptic agent manufactured by Abyssia Co., Ltd.)

To the carbon black dispersion thus obtained, was added 26 parts of the 30 wt % ether type urethane type resin (A) obtained in the above "Preparation of urethane type resin", and 32.5 parts of triethylene glycol monobutyl ether, 32.5 parts of glycerin, 3.25 parts of "Surfinol 465" (tradename, manufactured by Air Products and Chemicals, Inc.) and 130.75 parts of ion-exchanged water were added thereto to obtain a recording liquid. The recording liquid thus obtained had an average dispersion particle size of 67 nm and a viscosity of 4.05 mPa·s. The recording liquid was evaluated in accordance s with the above evaluation methods (1) to (9). The evaluation results are shown in the following Table 6.

EXAMPLE 2

Respective components as shown in the following Table 4 were dispersed by a beads mill dispersing machine using 0.8 mm zirconia beads to obtain an average dispersion particle size of 59.8 nm by monitoring its particle size distribution, and the dispersion thus obtained was subjected to a centrifugal separator and was filtrated by a 5 μm filter to remove coarse particles, thus obtaining a carbon black dispersion.

TABLE 4

| Components | Blending ratio (parts) |
|---|---|
| Styrene-acrylic acid type copolymer (25 wt % aqueous solution of potassium salt of "Johncryl 679" (acid value 215 mgKOH/g, Mw = 8500) manufactured by Johnson Polymer Co., Ltd.) | 10.4 |
| Ion-exchanged water | 71.5 |
| Glycerin | 5 |
| "Proxel GXL S" | 0.1 |
| "Carbon Black (A)" manufactured by Mitsubishi Chemical Corporation | 13 |
| Total | 100 |

To the carbon black dispersion thus obtained, was added 34.67 parts of the 30 wt % ether type urethane type resin (A) obtained in the above "Preparation of urethane type resin", and 32.5 parts of triethylene glycol monobutyl ether, 32.5 parts of glycerin, 3.25 parts of "Surfinol 465" and 122.08 parts of ion-exchanged water were added thereto to obtain a recording liquid. The recording liquid thus obtained had an average particle size of 60 nm and a viscosity of 4.63 mPa·s. The recording liquid was evaluated in accordance with the above evaluation methods (1) to (9). The evaluation results are shown in the following Table 6.

EXAMPLE 3

A carbon black dispersion was obtained by the same operation as in Example 2.

Separately, respective components as shown in the following Table 5 were dispersed by a beads mill dispersing machine using 0.8 mm zirconia beads to obtain an average dispersion particle size of 81 nm by monitoring its particle size distribution, and the dispersion thus obtained was subjected to a centrifugal separator and was filtrated by a 5 μm filter to remove coarse particles, thus obtaining a cyan pigment dispersion.

TABLE 5

| Components | Blending ratio (parts) |
|---|---|
| Styrene-acrylic acid type copolymer (25 wt % aqueous solution of ammonium salt of "Johncryl 679" (acid value 215 mgKOH/g, Mw = 8500) manufactured by Johnson Polymer Co., Ltd.) | 1.29 |
| Ion-exchanged water | 8.84 |
| Glycerin | 0.62 |
| "Proxel GXL S" | 0.01 |
| Cyan pigment Pig 15:3 | 1.61 |
| Total | 12.37 |

The above obtained carbon black dispersion and cyan pigment dispersion were mixed, and 34.7 parts of the 30 wt % ether type urethane type resin (B) obtained in the above "Preparation of urethane type resin" was added to the above obtained mixture, and 36.52 parts of triethylene glycol monobutyl ether, 36.52 parts of glycerin, 3.65 parts of "Surfinol 465" and 141.49 parts of ion-exchanged water were added thereto to obtain a recording liquid. The recording liquid thus obtained had an average dispersion particle size of 78 nm and a viscosity of 4.30 mPa·s. The recording liquid was evaluated in accordance with the above evaluation methods (1) to (9). The evaluation results are shown in the following Table 6.

EXAMPLE 4

A carbon black dispersion was obtained by the same operation as in Example 2, except that "#45" manufactured by Mitsubishi Chemical Corporation was used as a carbon black in place of "Carbon Black (A)".

To the carbon black dispersion thus obtained, was added 43.35 parts of the 30 wt % ester type urethane type resin (C) obtained in the above "Preparation of polyurethane type resin", and 36.52 parts of triethylene glycol monobutyl ether, 36.52 parts of glycerin, 3.65 parts of "Surfinol 465" and 132.8 parts of ion-exchanged water were added thereto to obtain a recording liquid. The recording liquid thus obtained had an average dispersion particle size of 80 nm and a viscosity of 4.25 mPa·s. The recording liquid was evaluated in accordance with the above evaluation methods (1) to (9). The evaluation results are shown in the following Table 6.

EXAMPLE 5

A carbon black dispersion was obtained by the same operation as in Example 2, except that "MCF88" manufactured by Mitsubishi Chemical Corporation was used as a carbon black in place of "Carbon Black (A)".

The carbon black dispersion thus obtained was mixed with the cyan pigment dispersion obtained in Example 3, and to the resultant mixture, was added 43.35 parts of the 30 wt % ester type urethane type resin (C) obtained in the above "Preparation of urethane type resins", and 36.52 parts of triethylene glycol monobutyl ether, 36.52 parts of glycerin, 3.65 parts of "Surfinol 465" and 132.8 parts of ion-exchanged water were then added thereto to obtain a recording liquid. The recording liquid thus obtained had an average dispersion particle size of 72 nm and a viscosity of 4.10 mPa·s. The recording liquid was evaluated in accordance with the above evaluation methods (1) to (9). The evaluation results are shown in the following Table 6.

COMPARATIVE EXAMPLE 1

To a carbon black dispersion obtained by the same operation as in Example 5, was added 26 parts of the 30 wt % ester type urethane type resin (D) obtained in the above "Preparation of urethane type resin", and 32.5 parts of triethylene glycol monobutyl ether, 32.5 parts of glycerin, 3.25 parts of "Surfinol 465" and 130.75 parts of ion-exchanged water were then added thereto to obtain a recording liquid. The recording liquid thus obtained had an average dispersion particle size of 60 nm and a viscosity of 3.08 mPa·s. The recording liquid was evaluated in accordance with the above evaluation methods (1) to (9). The evaluation results are shown in the following Table 6.

COMPARATIVE EXAMPLE 2

A carbon black dispersion obtained by the same operation as in Example 5 was mixed with the cyan pigment dispersion obtained in Example 3, and to the resultant mixture, was added 17.28 parts of the 30 wt % urethane type resin (C) obtained in the above "Preparation of urethane type resin", and 36.52 parts of triethylene glycol monobutyl ether, 36.52 parts of glycerin, 3.65 parts of "Surfinol 465" and 158.91 parts of ion-exchanged water were then added thereto to obtain a recording liquid. The recording liquid thus obtained had an average dispersion particle size of 81 nm and a viscosity of 5.18 mPa·s. The recording liquid was evaluated in accordance with the above evaluation methods (1) to (9). The evaluation results are shown in the following Table 6.

COMPARATIVE EXAMPLE 3

Pure ink HP51645A was loaded into an ink jet printer DJ970Cxi manufactured by Hewlett-Packard Development Company to carry out solid-printing by normal mode on an ink jet printer printing paper (PM photographic printing paper), and the solid-printing was evaluated in accordance with the above method. The evaluation results are shown in the following Table 6.

COMPARATIVE EXAMPLE 4

Pure ink BCI-3eBK was loaded into an ink jet printer BJ610F manufactured by CANON Inc., to carry out solid-printing by normal mode on an ink jet printer printing paper (PM photographic printing paper), and the solid-printing was evaluated in accordance with the above method. The evaluation results are shown in the following Table 6.

COMPARATIVE EXAMPLE 5

To a carbon black dispersion obtained in Example 2, was added 8.67 parts of the 30 wt % ester type urethane type resin (C) obtained in the above "Preparation of urethane type resin", and 32.5 parts of triethylene glycol monobutyl ether, 32.5 parts of glycerin, 3.25 parts of "Surfinol 465" and 148.08 parts of ion-exchanged water were added thereto to obtain a recording liquid. The recording liquid thus obtained had an average dispersion particle size of 47 nm and a viscosity of 3.40 mPa·s. The recording liquid was evaluated in accordance with the above evaluation methods (1) to (9). The evaluation results are shown in the following Table 6.

COMPARATIVE EXAMPLE 6

To a carbon black dispersion was obtained by the same operation as in Example 5.

The carbon black dispersion thus obtained was mixed with the cyan pigment dispersion obtained in Example 3, and 8.66 parts of the 30 wt % ester type urethane type resin (C) obtained in the above "Preparation of urethane type resin" was added to the above obtained mixture, and 36.52 parts of triethylene glycol monobutyl ether, 36.52 parts of glycerin, 3.65 parts of "Surfinol 465" and 167.49 parts of ion-exchanged water were then added thereto to obtain a recording liquid. The recording liquid thus obtained had an average dispersion particle size of 66 nm and a viscosity of 4.19 mPa·s. The recording liquid was evaluated in accordance with the above evaluation methods (1) to (9). The evaluation results are shown in the following Table 6.

Examples 1 to 5 and Comparative Examples 1 to 6 are summarized in the following Table 6.

TABLE 6

| | Examples | | | | |
| --- | --- | --- | --- | --- | --- |
| | 1 | 2 | 3 | 4 | 5 |
| Carbon black | MCF88 | A | A | #45 | MCF88 |
| Pigment | | | Pig 15:3 | Pig 15:3 | Pig 15:3 |
| Anionic resin | J683 | J679 | J679 | J679 | J679 |
| Polyurethane type resin used | A | A | B | C | C |
| Acid value of polyurethane type resin (mgKOH/g) | | 69 | 69 | 69 | 69 |
| Molecular weight Mw of polyurethane type resin (g/mol) | 20840 | 20840 | 20000 | 20000 | 20000 |
| Content of polyurethane urea part | 0 | 0 | 0 | 0 | 0 |
| Pigment concentration in recording liquid (wt %) | 4 | 4 | 4 | 4 | 4 |
| Resin concentration in recording liquid (wt %) | 3.2 | 4 | 3.65 | 4.36 | 4.36 |
| Dispersed pigment particle size in recording liquid D50 (nm) | 67 | 60 | 78 | 80 | 72 |
| Viscosity of recording liquid (mPa · s) | 4.05 | 4.63 | 4.3 | 4.25 | 4.1 |

TABLE 6-continued

| Printing density | 2.49 | 2.43 | 2.33 | 2.34 | 2.46 |
|---|---|---|---|---|---|
| Gloss | 76.4 | 69.5 | 70.8 | 70 | 60.3 |
| Printed film thickness (nm) | | | 230 | | |
| Printed surface roughness (μm) | | | 0.03 | | |
| Storage stability | Δ | ○ | ○ | Δ | Δ |
| Printing test | ○ | ○ | ○ | ○ | ○ |
| Visual evaluation | ○ | ○ | ○ | ○ | ○ |
| Water resistance | ○ | ○ | ○ | ○ | ○ |

| | Comparative Examples | | | | | |
|---|---|---|---|---|---|---|
| | 1 | 2 | 3 | 4 | 5 | 6 |
| Carbon black | MCF88 | MCF88 | | | A | A |
| Pigment | | Pig 15:3 | | | | Pig 15:3 |
| Anionic resin | J679 | J679 | | | J679 | J679 |
| Polyurethane type resin used | D | C | | | C | C |
| Acid value of polyurethane type resin (mgKOH/g) | 48 | 69 | | | 69 | 69 |
| Molecular weight Mw of polyurethane type resin (g/mol) | 20000 | 20000 | | | 20000 | 20000 |
| Content of polyurethane urea part | 2.4 | 0 | | | 0 | 0 |
| Pigment concentration in recording liquid (wt %) | 4 | 4 | | | 4 | 4 |
| Resin concentration in recording liquid (wt %) | 3.2 | 2.22 | | | 1.61 | 1.51 |
| Dispersed pigment particle size in recording liquid D50 (nm) | 60 | 81 | | | 47 | 66 |
| Viscosity of recording liquid (mPa · s) | 3.08 | 5.18 | | | 3.4 | 4.19 |
| Printing density | 2.3 | 2.35 | 2.5 | 3.24 | 2.44 | 2.33 |
| Gloss | 51.7 | 48.6 | 50.4 | 39.3 | 86.8 | 70.3 |
| Printed film thickness (nm) | | | 440 | 580 | | |
| Printed surface roughness (μm) | | | 0.04 | 0.11 | | |
| Storage stability | X | X | | | X | X |
| Printing test | ○ | ○ | ○ | ○ | ○ | ○ |
| Visual evaluation | X | X | X | X | ○ | ○ |
| Water resistance | ○ | ○ | ○ | ○ | ○ | ○ |

As described above, an aqueous recording liquid having a pigment dispersed in accordance with the present invention does not clog an ink jet nozzle, and is satisfactory in respect of storage stability of the recording liquid, water resistance, weather resistance and light resistance of a printed material, and can provide both satisfactory blackness and gloss feeling of a printed material particularly on a photographic image quality printing paper.

The entire disclosure of Japanese Patent Application No. 2003-057690 filed on Mar. 4, 2003 including specification, claims and summary is incorporated herein by reference in its entirety.

What is claimed is:

1. A pigment-dispersed aqueous recording liquid containing at least a pigment and resin, which comprises from 60 to 200 parts by weight of the resin to 100 parts by weight of the pigment, wherein at least one of the resin is a water-dispersible urethane based resin having an acid value of 50 to 200 mgKOH/g, and a weight fraction of a polyurethane urea part of which is at most 2.0 wt % to the urethane based resin, and the pigment dispersed in the recording liquid has a dispersion particle size D50 of from 40 to 100 nm, and wherein the water-dispersible urethane based resin is derived from a polyether diol.

2. The pigment-dispersed aqueous recording liquid according to claim 1, wherein the pigment includes at least a carbon black having a DBP absorption amount of from 30 ml/100 g to 100 ml/100 g.

3. The pigment-dispersed aqueous recording liquid according to claim 1, wherein the urethane based resin has a weight average molecular weight of higher than 5,000 but not higher than 100,000.

4. The pigment-dispersed aqueous recording liquid according to claim 1, wherein an acid value as a free acid of the urethane based resin is from 50 mgKOH/g to 100 mgKOH/g.

5. The pigment-dispersed aqueous recording liquid according to claim 1, wherein the resin includes a resin having an acid value of at least 50 mgKOH/g as a free acid in addition to the water-dispersible urethane based resin.

6. The pigment-dispersed aqueous recording liquid according to claim 1, wherein a solid-printed part having 14.5 mg per square inch of the pigment-dispersed aqueous recording liquid printed by ink jet recording system on a photographic image quality paper provides a printed thickness of at least 20 nm, an optical density of at least 2 and a 20° gloss value of at least 60.

7. The pigment-dispersed aqueous recording liquid according to claim 1, wherein the pigment includes a carbon black and a pigment other than the carbon black.

8. The pigment-dispersed aqueous recording liquid according to claim 7, wherein the pigment other than the carbon black is a cyan pigment.

9. A printed material printed with a pigment-dispersed aqueous recording liquid as defined in claim 1.

10. The printed material according to claim 9, wherein the printing is carried out by ejecting a pigment-dispersed aqueous recording liquid by an ink jet nozzle on a material to be recorded.

11. The printed material according to claim 9, which has a printed thickness of at least 20 nm, an optical density of at least 2 and a 20° gloss value of at least 60.

12. The printed material according to claim 9, which has an arithmetic average roughness of at most 0.04.

13. The printed material according to claim 9, wherein the pigment-dispersed aqueous recording liquid contains at least a carbon black and the printed material is a black printed material.

14. The pigment-dispersed aqueous recording liquid according to claim 1, wherein the water-dispersible urethane based resin is present in an amount of 60 to 200 parts by weight in terms of solid content to 100 parts by weight of the pigment.

15. The pigment-dispersed aqueous recording liquid according to claim 14, wherein the water-dispersible urethane based resin is present in an amount of 70 to 150 parts by weight in terms of solid content to 100 parts by weight of the pigment.

* * * * *